(12) United States Patent
Gelfenbeyn et al.

(10) Patent No.: US 11,954,451 B1
(45) Date of Patent: *Apr. 9, 2024

(54) OBSERVATION-BASED TRAINING OF ARTIFICIAL INTELLIGENCE CHARACTER MODELS

(71) Applicant: Theai, Inc., Mountain View, CA (US)

(72) Inventors: Ilya Gelfenbeyn, Sunnyvale, CA (US); Mikhail Ermolenko, Mountain View, CA (US); Kylan Gibbs, San Francisco, CA (US)

(73) Assignee: Theai, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,245

(22) Filed: Dec. 6, 2023

Related U.S. Application Data

(63) Continuation of application No. 18/140,748, filed on Apr. 28, 2023, now Pat. No. 11,875,129.

(60) Provisional application No. 63/335,929, filed on Apr. 28, 2022.

(51) Int. Cl.
*G10L 15/22* (2006.01)
*G06F 40/40* (2020.01)
*G06N 20/00* (2019.01)

(52) U.S. Cl.
CPC ............ *G06F 40/40* (2020.01); *G06N 20/00* (2019.01); *G10L 15/22* (2013.01)

(58) Field of Classification Search
CPC ..................................................... G10L 15/22
See application file for complete search history.

(56) References Cited

U.S. PATENT DOCUMENTS

| 11,444,893 B1* | 9/2022 | Kalluri | G06F 16/2379 |
|---|---|---|---|
| 11,645,479 B1* | 5/2023 | Coursey | G06F 40/58 |
| | | | 704/9 |
| 2022/0269924 A1* | 8/2022 | Kanungo | G06N 3/045 |
| 2023/0084688 A1* | 3/2023 | Rodrigo Cavalin | G06F 18/23 |
| | | | 709/206 |

(Continued)

OTHER PUBLICATIONS

Murakami, Yohei, Yuki Sugimoto, and Toru Ishida. "Modeling human behavior for virtual training systems." AAAI. 2005. (Year: 2005).*

*Primary Examiner* — Jialong He
(74) *Attorney, Agent, or Firm* — Georgiy L. Khayet

(57) ABSTRACT

Systems and methods for observation-based training of an Artificial Intelligence (AI) character model are provided. An example method includes receiving log data including interactions of a user and a first AI character model, receiving internal parameters of a second AI character model including a first plurality of heuristic machine learning models and a second plurality of primary machine learning models, pre-processing the log data to obtain one or more data streams including behavioral characteristics of the user, running the one or more data streams through the first plurality of heuristic machine learning models to produce intermediate outputs, composing the intermediate outputs into templated formats, and providing the templated formats to the second plurality of primary machine learning models. The internal parameters of the second AI character model are adjusted based on the templated formats such that the second AI character model mimics the behavioral characteristics of the user.

20 Claims, 13 Drawing Sheets

(56) References Cited

U.S. PATENT DOCUMENTS

2023/0316037 A1* 10/2023 Kebudi .................. A63F 13/79
                                                    463/40
2023/0376328 A1* 11/2023 Nagar .................... G06F 9/453

* cited by examiner

| Possible User Inputs 702 | Input Impact for Goals Model 704 |
|---|---|
| AI Character Personality and Background Description 706 | Allow Constitution of AI Character Personality and Style, Which Biases the Reason for which, and Manner in which, the AI Characters Pursue Goals 708 |
| Motivations 710 | Structure Top-Level Motivations That Underlie the Reasoning for All Character Behavior and Directions 712 |
| Flaws and Challenges 714 | Allow establishment of flaws and challenges, which may influence, motivate, or hinder goal enactment by an AI character 716 |
| Identity Profile 718 | Specify elements of an AI character (e.g., role, interests) which may have an influence on how the AI character pursues goals (e.g., a policeman trying to uncover information differently from a salesperson) 720 |
| Emotional Profile 722 | Establish an emotional profile of an AI character, such that it may influence expression of goals (e.g., more introverted character may be nervous if having to try and sell something) 724 |
| Personal Memory 726 | Provide an AI character with personal memories that may be brought up during the pursuit of a goal (e.g., if an AI character previously got bit by a dog and has to tie up a dog, the AI character may express fear or angst) 728 |
| World Knowledge 730 | Integrate information about the world to contextualize goal pursuit (e.g., the AI character may know that the police are corrupt in an area, and when pursuing an investigation show more caution) 732 |
| Contextual Knowledge 734 | Include information about an environment of context to contextualize goal pursuit (e.g., if a volcano just exploded and the AI character is asked to carry a girl to safety, the AI character may show more hurriedness) 736 |
| Voice Configuration 738 | Configuration of voice in real-time can allow AI characters to show different expressions during a goal (e.g., if an AI character is saving someone, the voice may be loud and forceful) 740 |
| Dialogue Style Controls 742 | Dialogue Style influences the manner and style of speech (e.g., a Wild West bartender may still use slang when selling a drink) 744 |
| Goals and Actions 746 | Specify the goals that an AI character has per scene, and then set up the actions the AI character has available to pursue the goal 748 |
| Animation Triggers and Controls 750 | Determine which actual physical movements the AI character can take to pursue the goal (e.g., take an item off the shelf and show the player when selling) 752 |

FIG. 7A

OBSERVATION-BASED TRAINING OF ARTIFICIAL INTELLIGENCE CHARACTER MODELS

CROSS-REFERENCE TO RELATED APPLICATIONS

The present application is a Continuation of and claims the priority benefit of U.S. patent application Ser. No. 18/140,748, entitled "OBSERVATION-BASED TRAINING OF ARTIFICIAL INTELLIGENCE CHARACTER MODELS," filed on Apr. 28, 2023, which claims priority of U.S. Provisional Patent Application No. 63/335,929 filed on Apr. 28, 2022, entitled "OBSERVATION-BASED TRAINING OF ARTIFICIAL INTELLIGENCE CHARACTER MODELS." The subject matter of the aforementioned applications is incorporated herein by reference in its entirety for all purposes.

TECHNICAL FIELD

This disclosure generally relates to artificial intelligence (AI)-based character models. More particularly, this disclosure relates to observation-based training of AI character models.

BACKGROUND

Virtual characters are widely used in various software applications, such as games, metaverses, social media, messengers, video communication tools, and online training tools. Some of these applications allow users to interact with virtual characters. However, existing models of virtual characters are typically developed for specific applications and do not allow integration with other applications and environments. Moreover, existing virtual character models are typically based on descriptions of specific rules and logic.

Parameters of conventional virtual character models typically remain unchanged for the whole time of interaction between the users and the virtual characters. This approach results in virtual character models that lack the ability to modify their behavioral characteristics. Specifically, it is hard to change the behavior of the conventional virtual characters to mimic a desired behavior that some virtual characters or users previously had. Accordingly, tools are needed that would allow virtual character models to train to change their interactions with users based on observing interactions between users and virtual characters.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one example embodiment, a computing platform for observation-based training of an AI character model is provided. The computing platform may include a processor and a memory storing instructions to be executed by the processor. The computing platform may be configured to receive log data that include interactions of a first user and a second user. The computing platform may be further configured to adjust, based on the log data, parameters of the AI character model to cause the AI character model to mimic behavioral characteristics of the first user in follow-up conversations with further users.

In another example embodiment, a method for observation-based training of an AI character model is provided. The method may be implemented with a processor of a computing platform for observation-based training of an AI character model. The method may commence with receiving, by the processor, log data including interactions of a first user and a second user. Upon receiving the log data, the method may proceed with adjusting, by the processor and based on the log data, parameters of the AI character model to cause the AI character model to mimic behavioral characteristics of the first user in follow-up conversations with further users.

According to another example embodiment, provided is a non-transitory computer-readable storage medium having instructions stored thereon, which, when executed by one or more processors, cause the one or more processors to perform steps of the method for observation-based training of an AI character model.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 7A shows an architecture diagram illustrating AI character models with goal-oriented behavior, according to an example embodiment.

DETAILED DESCRIPTION

Figure 1:
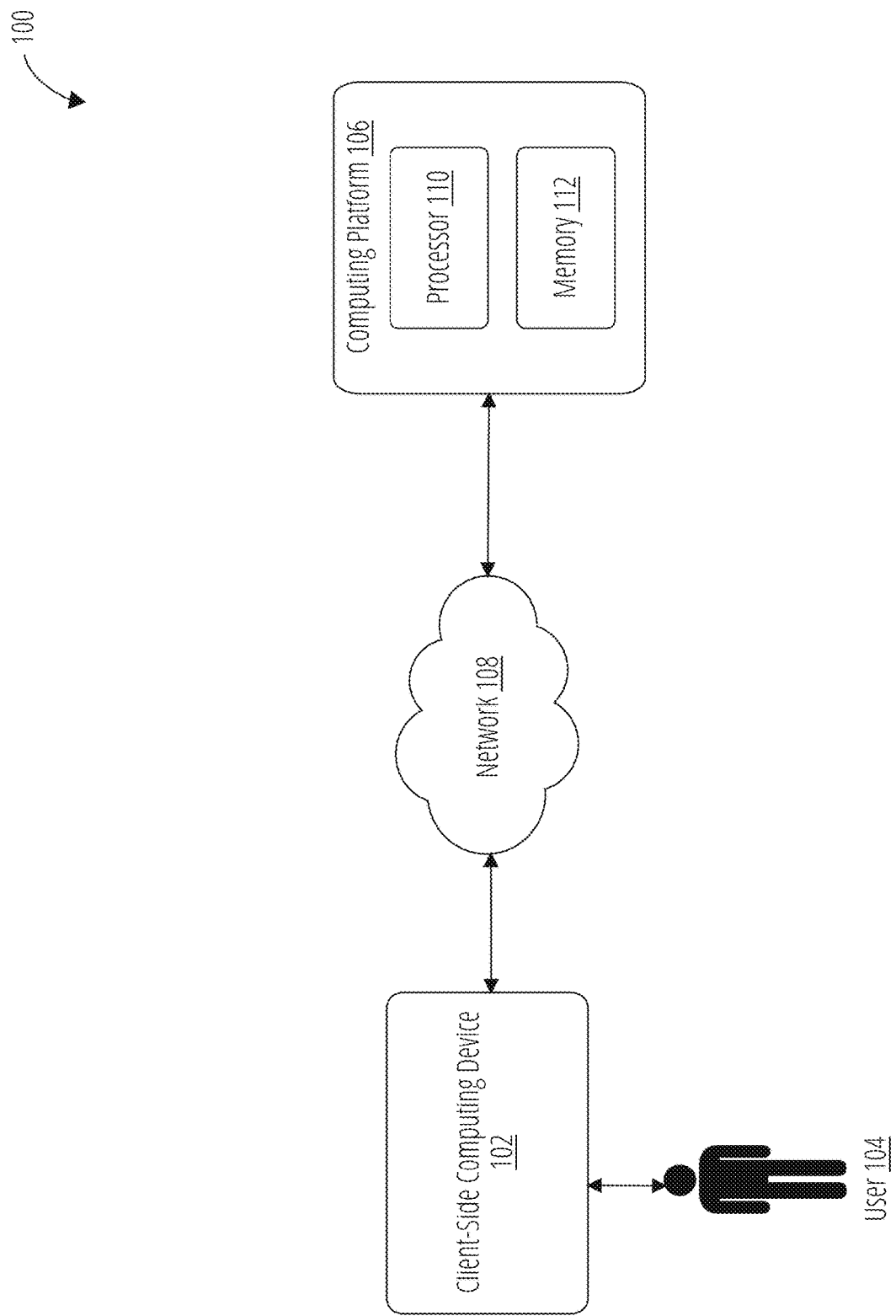
FIG. 1 illustrates an environment within which systems and methods for observation-based training of an AI character model can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

Embodiments of the present disclosure are directed to a platform for generating AI character models and performing interactions between the AI character models and users. In one example embodiment, the platform may receive a description of a character and generate an AI character model capable of interacting with users verbally and through emotions, gestures, actions, and movements. The description can be provided as natural language describing a role, motivation, and environment of an AI character. The platform may utilize a common knowledge concerning the AI character to train the AI character model in order to interact with the users. The AI character model may evolve its characteristics, change emotions, and acquire knowledge based on conversations with the users.

The AI character model may utilize a LLM in conversations with the users. In order to obtain more effective and appropriate responses to user questions and messages, the platform may apply various restrictions, classifications, shortcuts, and filters in response to user questions. These targeted requests to the LLMs will result in optimized performance. For example, prior to sending a request to the LLM, the platform may classify and filter the user questions and messages to change words based on the personalities of AI characters, emotional states of AI characters, emotional states of users, context of a conversation, scene and environment of the conversation, and so forth. Similarly, the platform may adjust the response formed by the LLM by changing words and adding fillers based on the personality, role, and emotional state of the AI character. The AI character model may change emotions based on the role of the AI character and in response to emotions of the user.

The platform may include integration interfaces, such as application programming interfaces (APIs), allowing external applications to use the AI character model. The AI character models generated by the platform can be used in game applications, virtual events and conversations, corporate training, and so on.

Some embodiments of the present disclosure relate to a system and a method for observation-based training of an AI character model. The system and the method may be integrated into the platform for generating AI character models. The AI character model may be presented to the user in the form of an AI character in a virtual environment provided to the user via a client-side computing device.

The observation-based training of an AI character model is referred to as a role-based training of the AI character model. The role-based training of the AI character model may result in learning by the AI character model to generate an AI character that has parameters of an actor that played a role of a character. The system may use a pre-trained AI character model implemented as a pre-trained neural network, receive log data, and adjust the parameters of the AI character model based on the log data. The neural network may have a plurality of nodes and connections. The adjusting of the parameters of the AI character model may include updating parameters associated with the nodes and the connections based on the log data to predict with higher probability the instances of behavioral characteristics that are desirable or that mimic the log data.

The adjustment of the parameters may include learning by the AI character model by observing the log data. For example, the system may read a log of conversations between a first user and a second user and the description of a scene in a virtual environment. In the interactions between the first user and the second user, the second user may play a specific role (for example, a barista). Upon reading the log data, the system may generate, based on the log data and the description of the scene, the parameters of an AI character that is a virtual barista.

Thus, the system may provide a fine-tuned AI character model that is more specific to the log data provided to the AI character model. Accordingly, the AI character model trained by the system may provide AI characters that mimic behavioral characteristics observed by the AI character model based on the log data.

Referring now to the drawings, FIG. 1 illustrates an environment 100 within which systems and methods for observation-based training of an AI character model can be implemented. The environment 100 may include a client-side computing device 102 associated with a user 104, a computing platform 106 for providing an AI character model (also referred to herein as a computing platform 106), and a data network shown as a network 108. The computing platform 106 and client-side computing device 102 (also referred to herein as a client) may communicate via the network 108.

The client-side computing device 102 may include, but is not limited to, a smartphone, a laptop, a personal computer, a desktop computer, a tablet computer, a phablet, a personal digital assistant, a mobile telephone, a smart television set, a personal computing device, and the like. The computing platform 106 may include a processor 110 and a memory 112 storing instructions to be executed by the processor 110.

The network 108 can refer to any wired, wireless, or optical networks including, for example, the Internet, intranet, a Local Area Network (LAN), a Personal Area Network, Wide Area Network (WAN), a Virtual Private Network, a Wi-Fi® network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, the network 108 may include a corporate network, a data center network, a service provider network, a mobile operator network, or any combinations thereof.

Figure 2:
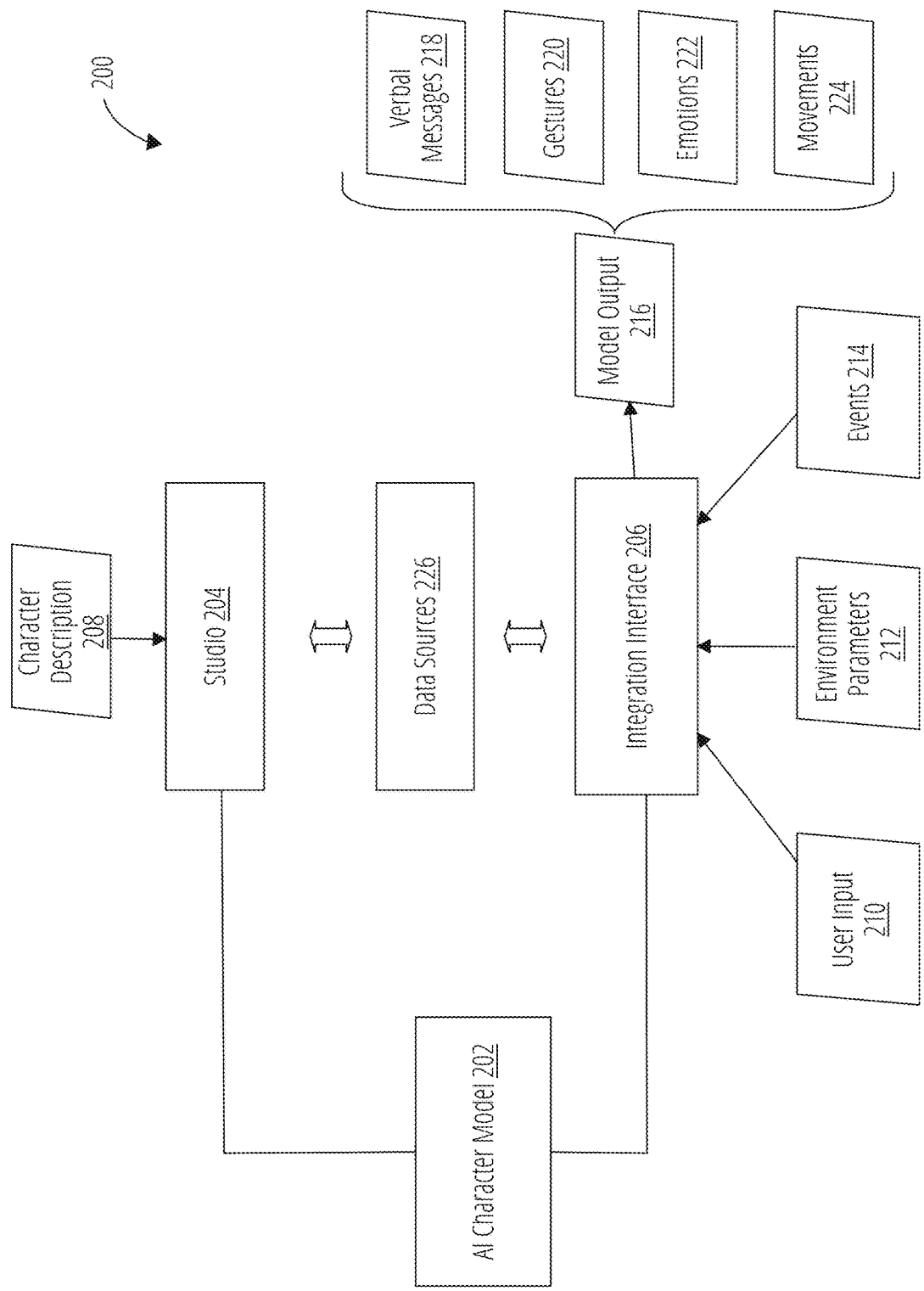
FIG. 2 is a block diagram illustrating a platform for generating an AI character model, according to an example embodiment.

The computing platform 106 may be associated with an AI character model (shown in detail in FIG. 2). The AI character model may be configured to generate AI-based characters, also referred herein to as AI characters. The user 104 may use the computing platform 106 to create the AI character models and interact with the AI character models via the client-side computing device 102 in a virtual environment associated with the AI character. The virtual environment can be generated by the client-side computing device 102 for presenting to the user 104. The computing platform 106 is shown in detail in FIG. 2 as a platform 200.

FIG. 2 illustrates a platform 200 for generating AI character models, according to an example embodiment. The platform 200 may include a studio 204, an integration interface 206, and an AI character model 202. AI character models are also referred to herein as AI-based character models. The studio 204 and the integration interface 206 may be in communication with data sources 226. The data sources 226 may include online search services. The data sources 226 may include a set of clusters each associated with a type of a feature of an AI character.

In one example embodiment, the studio 204 may receive, via a user interface, a character description 208 of an AI character. The studio 204 may generate, based on the character description 208, an AI character model 202 corresponding to the AI character. An AI character is also referred to herein as an AI-based character.

The character description 208 can be provided using a natural human language. The character description may include a description of an AI character similar to a description of a character to be played that can be provided to a real actor. The user interface of the studio 204 may include input fields allowing a developer to enter different aspects (i.e., parameters) of the AI character. Each input field may define a part of the brain of the AI character.

The input fields may include a text field for entering a core description of the AI character. An example core description can include "Buddy is a kind young man from Argentina." The input fields may include a text field for entering a motivation of the AI character. An example motivation may include "Buddy likes to dance."

The input fields may also include a text field for entering common knowledge and facts that the AI character may possess. For example, the field for common knowledge may include "orcs from Mordor; orcs like to eat hobbits."

The input fields may include fields for selecting an avatar and voice of the AI character. The input fields may include fields for defining memory and personality features of the AI character. The input fields may also include a text field describing the scene and environment in which the AI character is placed. For example, the text field for the scene may include "savanna," "city," "forest," "bar," and so forth.

The integration interface 206 may receive a user input 210, environment parameters 212, and events 214 and generate, based on the AI character model 202, a model output 216.

The user input 210 may include voice messages of a user. The voice messages may include phrases commonly used in conversations. The integration interface 206 may generate, based on the voice messages, requests and provide the request to the AI character model 202 to generate the model output 216. In an example embodiment, the requests may include text messages verbalized by the user and an emotional state of the user.

The model output 216 may include verbal messages 218, gestures 220, emotions 222, and movements 224. The verbal messages 218 may include responses to the voice messages of the user. The gestures 220 may include specific hand and facial movements of the AI character, either accompanying the verbal messages 218 or occurring without the verbal messages 218. Gestures 220 may include, for example, waving goodbye, nodding to indicate agreement, or pointing to indicate a direction. Gestures 220 are typically intentional and have a specific meaning that is understood by those familiar with the culture or context in which they are used. Emotions 222 may include intonations of the voice of the AI character while uttering the verbal messages 218 or facial expressions of the AI character. Movements 224 may refer to the overall movements and postures of the body of the AI character, including the position of the arms, legs, and torso. The movements 224 can be used to convey a range of emotions and attitudes, such as confidence, relaxation, or nervousness. Movements 224 can be both intentional and unintentional.

Figure 3:
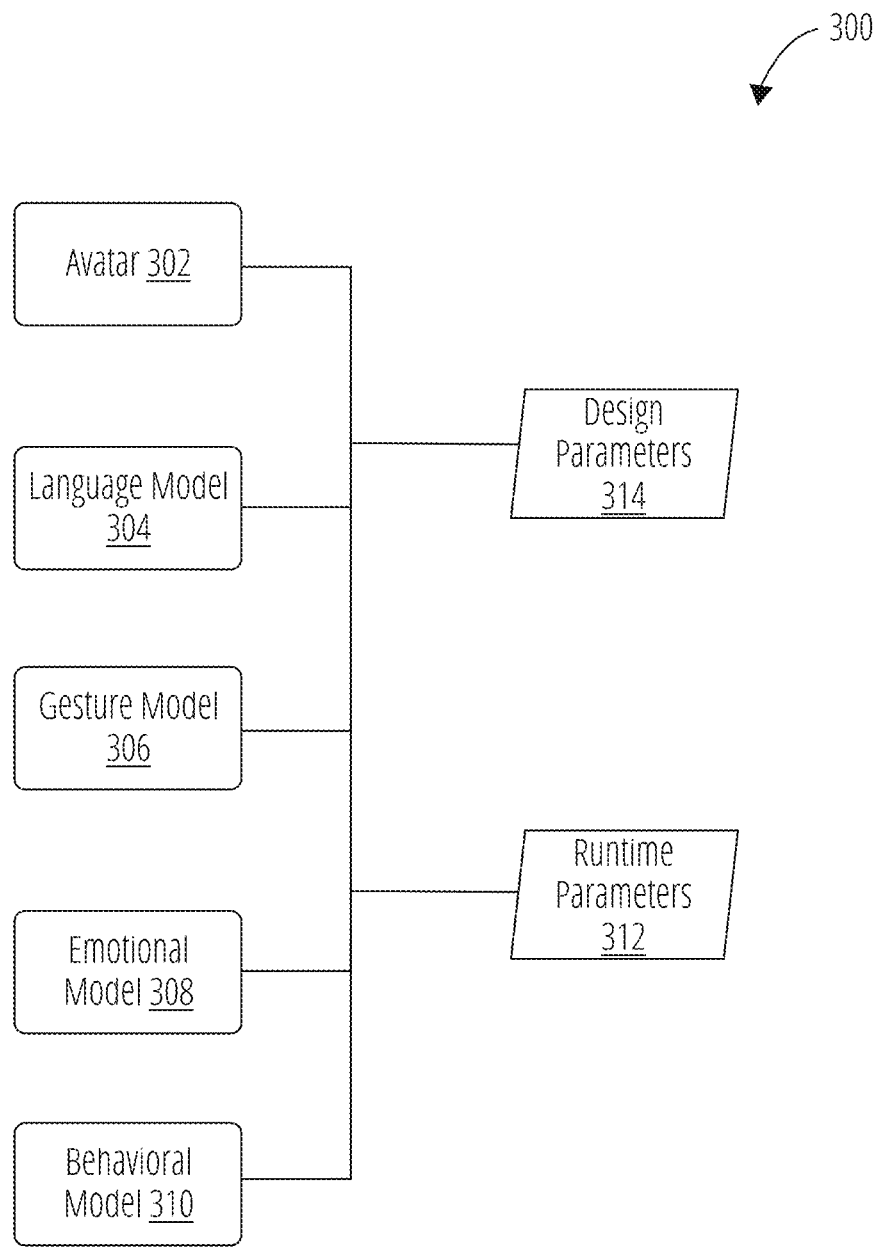
FIG. 3 provides additional details for an AI character model, in accordance with an example embodiment.

FIG. 3 provides additional details of an AI character model 300, in accordance with an example embodiment. The AI character model 300 may include a set of models including an avatar 302, a language model 304, a gesture model 306, an emotional model 308, a behavioral model 310, and the like. The models may include machine learning models. In some embodiments, the models can be implemented as artificial neural networks. The AI character model 300 can include runtime parameters 312 and design parameters 314.

The design parameters 314 may correspond to settings for personality and general emotions of an AI character. The design parameters 314 can be generated based on character description 208 received via the studio 204 shown in FIG. 2.

The runtime parameters 312 may correspond to an emotional state of an AI character. The emotional state can be changed based on conversations with the user, elements in the scene, the surrounding environment in which the AI character is currently present, and so forth.

The avatar 302 may include a three-dimensional body model rendering the AI character. In some embodiments, the avatar 302 can be created using applications currently available on the market.

The language model 304 can be based on a LLM. The LLM is a machine learning algorithm that can recognize, predict, and generate human languages on the basis of very large text-based data sets. The language model 304 may form a request for the LLM, receive a response from the LLM, and process the response from the LLM to form a response to voice messages of the user. The request for the LLM can include classification and adjustment of the text requests from the integration interface 206, according to the current scene, environmental parameters, an emotional state of the AI character, an emotional state of the user, and current context of the conversation with the user. Processing of the response from the LLM may include filtering of the response to exclude unwanted words, verifying relevancy of the response, changing the words in the response, and adding fillers to phrases according to the personality of AI characters. In other embodiments, the language model 304 may also retrieve data from available sources, such as Wikipedia® or Game Wikipedia®, to generate the response.

The gesture model 306 may generate a movement of the body of the AI character based on the response to the user, an emotional state of the AI character, and current scene parameters. For example, the AI character may turn to the user and raise a hand in response to a greeting from the user. The greeting gestures can differ based on scenes and environments.

The emotional model 308 may track the emotional state of the AI character based on the context of the conversation with the user, an emotional state of the user, a scene and environmental parameters, and so forth.

The behavioral model 310 may track and change behavioral characteristics of the AI character as a result of conversations with users or changes in the environment and scenes during a predetermined time period.

In general, the LLM can statistically suggest a continuation to any input provided to the LLM. If a conversation is started by using the LLM, the LLM may propose the next step for the conversation. For example, if a conversation includes a story related to some topic, the LLM may propose the next line for the story.

One of the key characteristics of LLMs is the fact that LLMs are large. In particular, the LLMs are trained on vast amounts of data. When used in conversations, the LLMs can statistically suggest some text determined by the LLMs to be meaningful in the next step of the conversation. Therefore, the LLMs conventionally build the conversation based on the text itself.

Figure 4:
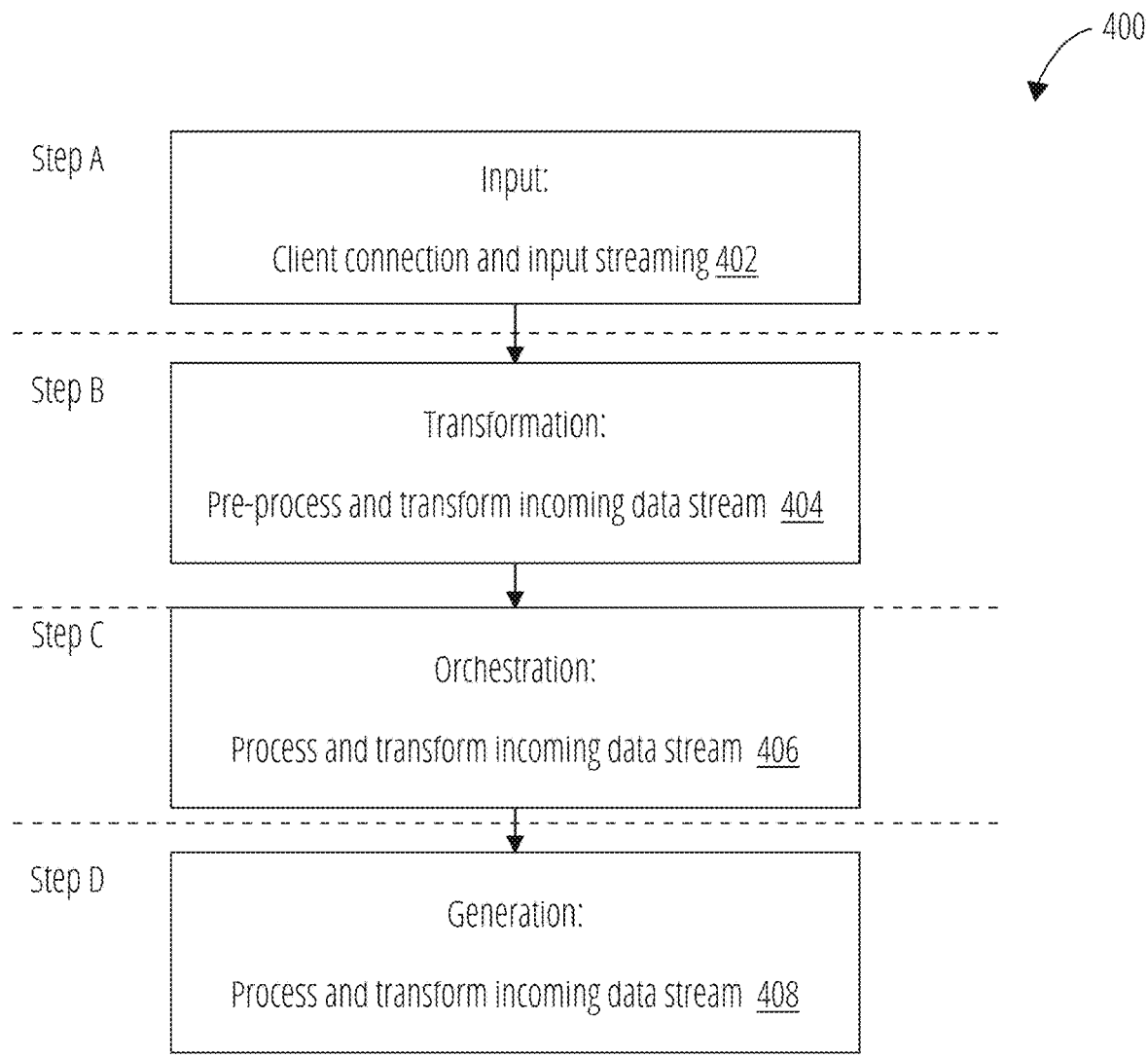
FIG. 4 is an architecture diagram that shows using a surrounding architecture of an AI character model to control an output and behavior generated by large language models (LLMs), according to an example embodiment.

FIG. 4 is an architecture diagram 400 that shows using a surrounding architecture of an AI character model to control an output and behavior generated by LLMs, according to an example embodiment. The main steps implemented to control the output and behavior of AI characters using the AI character model include an input step 402 (step A), a transformation step 404 (step B), an orchestration step 406 (step C), and a generation step 408 (step D). The input step 402 includes providing a connection with a client and performing input streaming. The transformation step 404 includes pre-processing and transforming an incoming data stream. The orchestration step 406 and the generation step 408 include processing and transforming an incoming data stream. Steps A-D are shown in detail in FIG. 5, FIG. 6A, and FIG. 6B.

Figure 5:
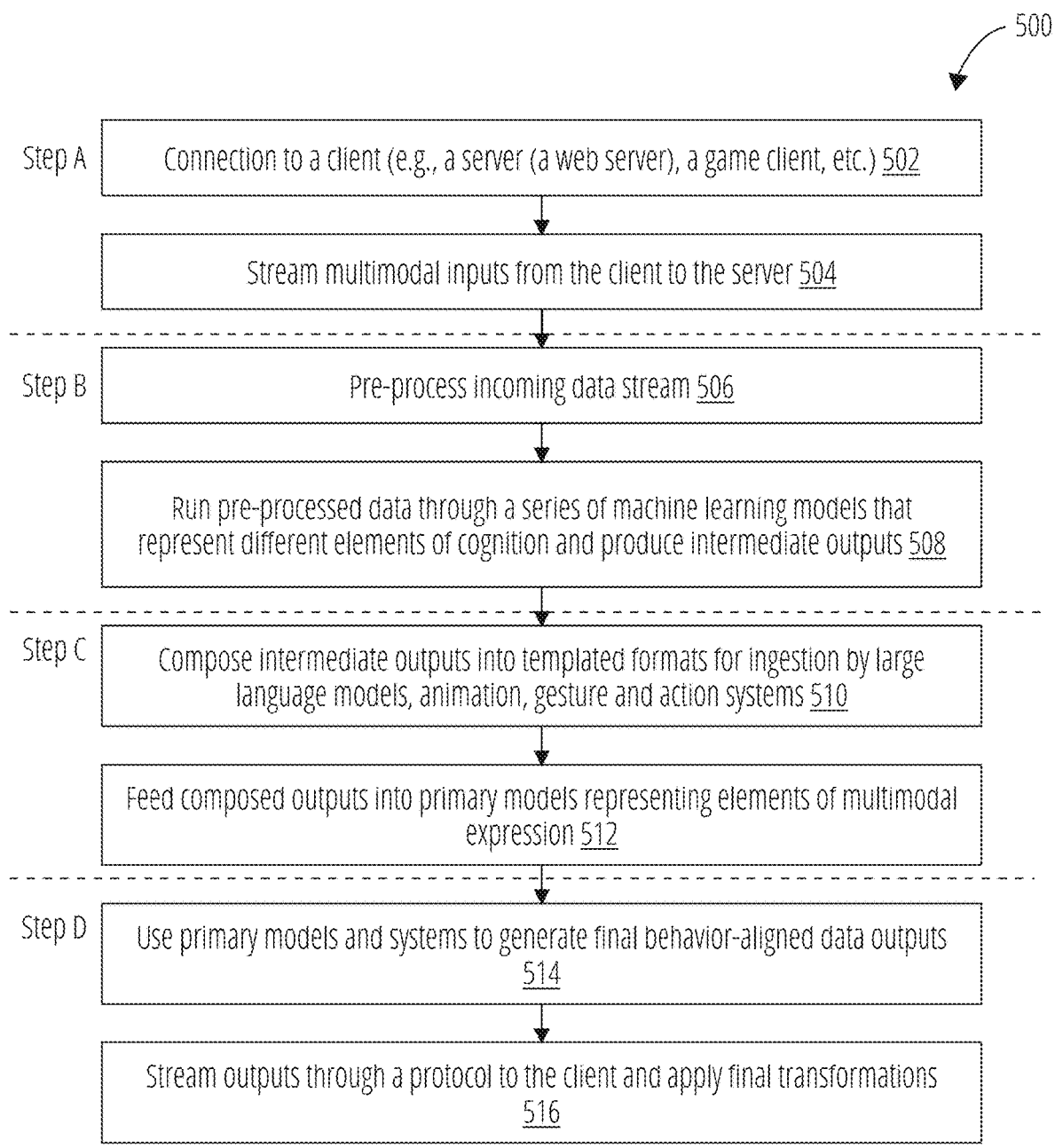
FIG. 5 is a detailed architecture diagram showing a surrounding architecture of an AI character model, according to an example embodiment.

FIG. 5 is a detailed architecture diagram 500 showing a surrounding architecture of an AI character model, according to an example embodiment. The input step (step A) may include establishing a connection between a client and a server, as shown in block 502. In an example embodiment, the client may include a user device associated with a user. The user may use the client device to interact with AI characters in a virtual environment using an application running on the user device. To establish the connection between the system of the present disclosure and the client, a server (e.g., a web server), a game client, and an application running on the user device may be provided. The server, the game client, and the application may be set up based on predetermined rules to enable streaming multimodal inputs from the client to the server, as shown in block 504. The inputs are shown in detail in FIG. 6A.

Figure 6A:
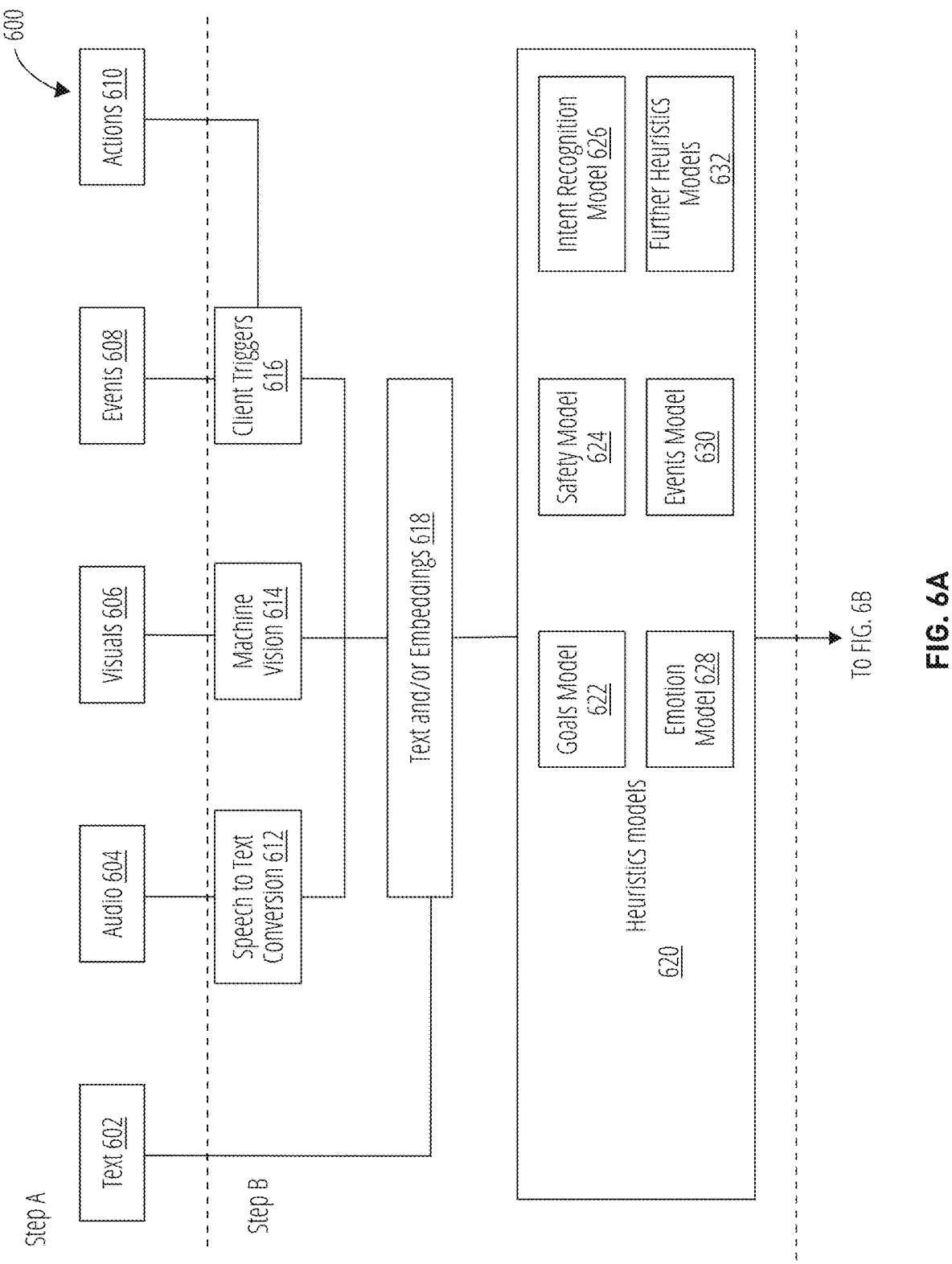
FIG. 6A is a detailed architecture diagram showing a surrounding architecture of an AI character model, according to an example embodiment.
Figure 6B:
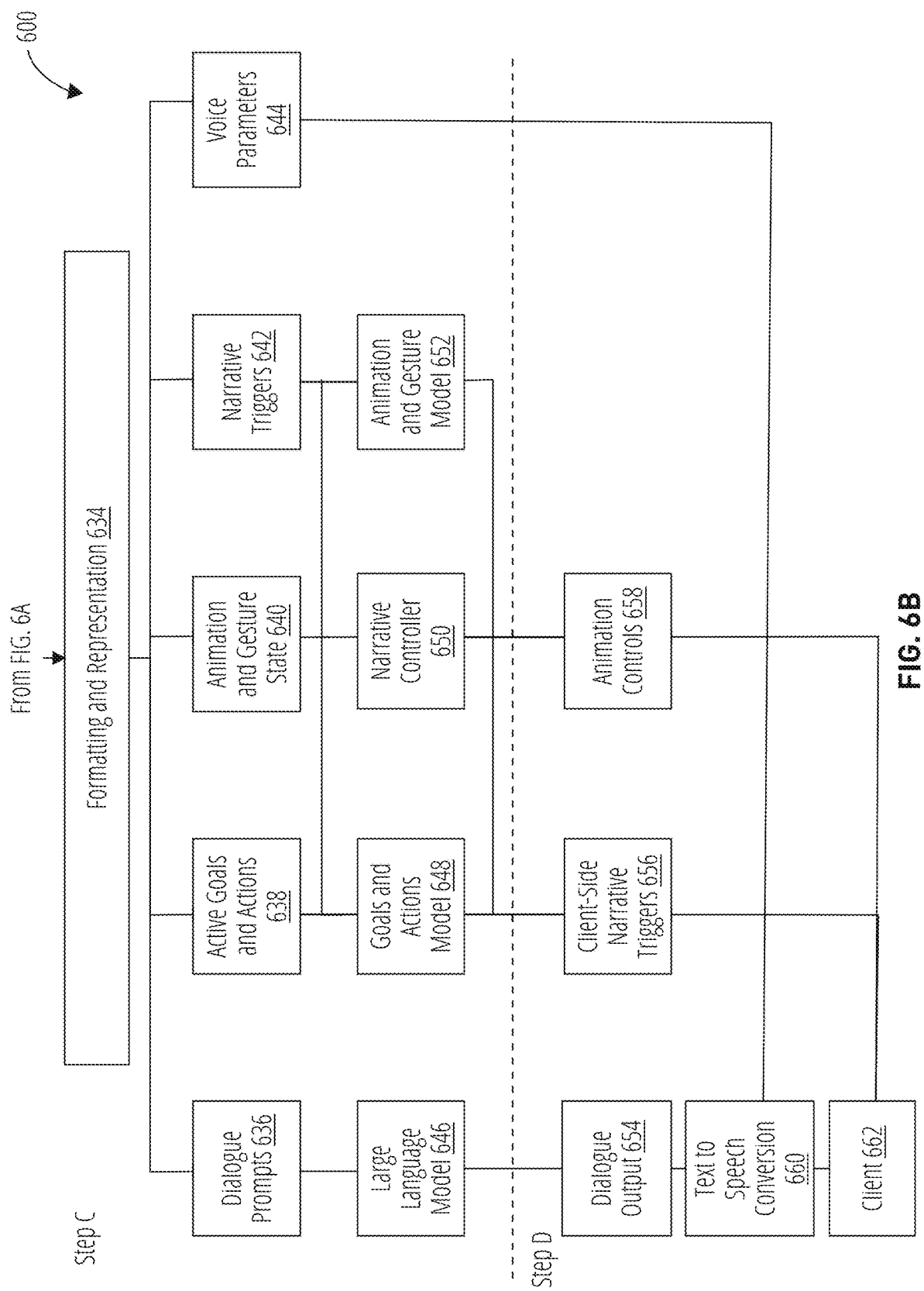
FIG. 6B is a detailed architecture diagram showing a surrounding architecture of an AI character model, according to an example embodiment.

FIG. 6A and FIG. 6B show a detailed architecture diagram 600 that illustrates a surrounding architecture of an AI character model, according to an example embodiment. The connection established between the client and the server via predetermined protocols enables collecting a plurality of streams of inputs from the client. Each stream may be associated with one of multiple modalities. In an example embodiment, the modality may include a type of data. As shown in FIG. 6A, the inputs collected from the client may include text 602, audio 604, visuals 606, events 608, actions 610, gestures (not shown), and so forth.

Referring again to FIG. 5, the transformation step (step B) may include pre-processing the incoming streams of data in block 506. The streams of inputs may be pre-processed differentially based on the specific modality. The pre-processing may include converting the received inputs into a singular format. The pre-processing is shown in detail in FIG. 6A.

As shown in FIG. 6A, the text 602 is in the form of a natural language and may need no pre-processing. The audio 604 may be pre-processed using a speech to text conversion 612, in the course of which the audio input may be transformed into text. The visuals 606 may be pre-processed using a machine vision 614 based on object classification, environment understanding, and so forth.

The events 608 may include any event received from the client. An example event may include a button click in a game, an AI character moving a sword in a game, a button click in a web application, and so forth. The actions 610 may be received from an environment of AI characters with which the user interacts. An example action may include reacting to a horse riding by in an application, calling a web hook to retrieve information, and so forth. The events 608 and the actions 610 may be processed into client triggers 616. Based on the pre-processing, all inputs may be transformed into text and/or embeddings 618. The embeddings (also referred to as word embeddings) are word representations, in which words with similar meaning have a similar representation. Thus, a pre-processed data stream in the form of text and/or embeddings 618 may be obtained upon pre-processing of the received inputs.

Referring again to FIG. 5, the transformation step (step B) may further include running the pre-processed data through a series of machine learning models that represent different elements of cognition and producing intermediate outputs, as shown in block 508. Processing the data using the series of machine learning models is shown in detail in FIG. 6A.

As shown in FIG. 6A, the text and/or embeddings 618 may be passed through a plurality of machine learning models shown as heuristics models 620. The processing of the text and/or embeddings 618 using the heuristics models 620 may include passing the text and/or embeddings 618 through a goals model 622, a safety model 624, an intent recognition model 626, an emotion model 628, an events model 630, and a plurality of further heuristics models 632.

The goals model 622 may be configured to process the text and/or embeddings 618 and recognize, based on what was said by the user or the AI character, what goals need to be activated. The safety model 624 may be configured to process the text and/or embeddings 618 and filter out unsafe responses. The intent recognition model 626 may be configured to process the text and/or embeddings 618 and determine what a player (i.e., a user) intends to do and use an intent to trigger one or more events at a later point of interaction of the player with AI characters in the game.

The emotion model 628 may be configured to process the text and/or embeddings 618 and update, based on what the player said, the emotions of the AI character. The events model 630 may be configured to process the text and/or embeddings 618 and determine the events. The events may act as triggers for performing an action based on predetermined rules. For example, a predetermined rule may include a rule according to which when the player steps into a specific location (the event) near the AI character, the AI character takes a predetermined action.

Upon the processing of the data, the heuristics models 620 may provide intermediate outputs. Each of the intermediate outputs provided by the heuristics models 620 may be a differential element. Specifically, the goals model 622, the safety model 624, the intent recognition model 626, the emotion model 628, and the events model 630 may each provide a specific sort of a separate element. The separate elements need to be orchestrated by composing together into a specific templated format.

Referring again to FIG. 5, the orchestration step (step C) may include composing the intermediate outputs received from the heuristics models into templated formats for ingestion by LLMs and animation, gesture, and action models in block 510. Upon composing the intermediate outputs into a template, the composed outputs may be fed into primary models representing elements of multimodal expression, as shown in block 512. The orchestration step (step C) is further shown in detail in FIG. 6B.

As shown in FIG. 6B, the orchestration step (step C) may include formatting and representation 634 of the intermediate outputs received from the heuristics models. Upon being formatted, the composed data may be sent to another series of AI models. Specifically, the composed data received in block 510 shown in FIG. 5 may include dialogue prompts 636, active goals and actions 638 (i.e., what goals and actions need to be active based on what was said or done by the user or the AI character), animation and gesture state 640 (i.e., what gestures or animations need to be active depending on the emotional state and the goal), narrative triggers 642, voice parameters 644, and so forth. The dialogue prompts 636 may be provided to a LLM 646. The active goals and actions 638 may be provided to a goals and actions model 648, the narrative controller 650, and the animation and gesture model 652. The animation and gesture state 640 may be provided to the goals and actions model 648, the narrative controller 650, and the animation and gesture model 652.

The narrative triggers 642 may be provided to the goals and actions model 648, the narrative controller 650, and the animation and gesture model 652. An example of the narrative triggers 642 may include words "I want to be in the investigation" said by the player. The goals and actions model 648, the narrative controller 650, and/or the animation and gesture model 652 may receive this narrative trigger and change the storyline and progress forward in the game.

The voice parameters 644 may be used for enacting the voice in the virtual environment. For example, if the AI character is angry, the voice parameter "angry" may be used to change the voice of the AI character in the game. If the state of the AI character changes to very forceful, the state can be shown by changing the voice of the AI character.

Referring again to FIG. 5, the generation step (step D) may include using primary models and systems to generate final behavior-aligned data outputs in block 514. The generation step (step D) may further include streaming outputs through predetermined protocols to the client and applying final transformations in block 516. The generation step (step D) is further shown in detail in FIG. 6B.

As shown in FIG. 6B, the LLM 646 is a model used to generate a dialogue output 654. The goals and actions model 648 and the narrative controller 650 both decide what needs to be sent to the client side. The client side may be represented by a client engine, a game engine, a web application running on a client-side computing device, and the like. The goals and actions model 648 and the narrative controller 650 may decide what needs to be enacted on the client side. The animation and gesture model 652 may decide what animations or gestures need to be activated on the client side to enact the behavior of AI characters. Therefore, the goals and actions model 648, the narrative controller 650, and the animation and gesture model 652 provide client-side narrative triggers 656 and animation controls 658. The dialogue output 654, the client-side narrative triggers 656, and the animation controls 658 provide the dialogue, the events, the client-side triggers, and the animations that need to be enacted on the client side.

The dialogue output 654, the client-side narrative triggers 656, the animation controls 658, and the voice parameters 644 may be processed using text to speech conversion 660. The output data obtained upon applying the text to speech conversion 660 are sent as a stream to the client 662. The game engine animates the AI character based on the received data to provide the generative behavior of the AI character. The animating may include, for example, instructing the AI character on what to say, how to move, what to enact, and the like.

Figure 7B:
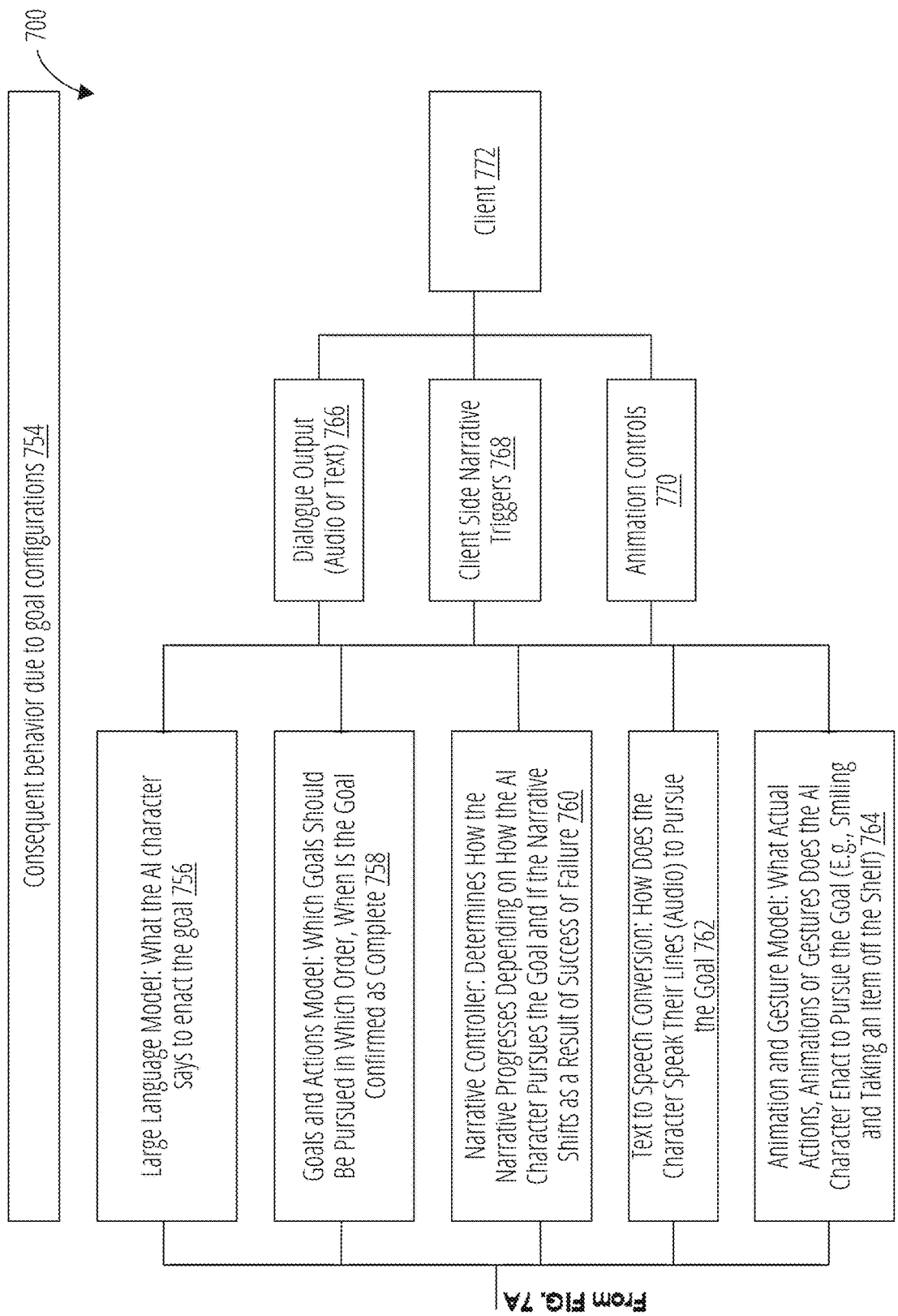
FIG. 7B shows an architecture diagram illustrating AI character models with goal-oriented behavior, according to an example embodiment.

FIG. 7A and FIG. 7B show an architecture diagram 700 illustrating AI character models with goal-oriented behavior, according to an example embodiment. The AI character models may include generative models configured to follow sequential instructions for dialog and actions that are driven by a specific purpose or intent for AI-driven characters. FIG. 7A shows possible user inputs 702 and input impact for goals model 704. The possible user inputs 702 include fields that are exposed to the user and can be changed by the user in the studio. The input impact for goals model 704 includes impacts of each user input on the goals model.

Compared to general language models that provide general goals for AI characters, the goals model enables providing specific goals. FIG. 7A shows that each type of configuration caused by the possible user inputs 702 may influence the goals and actions of the AI character. More specifically, the AI character personality and background description 706 selected by the user has an impact on the constitution of AI character personality and style, which biases the reason for which, and manner in which, the AI character pursues goals, as shown in block 708. Therefore, the AI character personality and background description 706 may influence how the AI character enacts its goals. For example, if the AI characters are Alice in Wonderland versus Jack Sparrow, the AI characters may have the exact same goal (e.g., to show their house to a player). However, the AI characters may show their houses in completely different ways because the AI characters represent two different people.

The motivations 710 received from the user may structure top-level motivations that underlie the reasoning for all AI character behavior and directions, as shown in block 712. Therefore, the motivations 710 may effectively determine why this AI character is pursuing this goal, i.e., determine the top-level motivation of the AI character. For example, the motivation of Alice in Wonderland is to get home. The goals of Alice are to ask the Mad Hatter what he knows about Wonderland. These goals may be determined and provided to the top-level motivation.

Flaws and challenges 714 selected by the user allow establishment of flaws and challenges for the AI character, which may influence, motivate, or hinder goal enactment by the AI character, as shown in block 716.

An identity profile 718 selected by the user may specify elements of an AI character (e.g., role, interests) which may have an influence on how the AI character pursues goals (e.g., a policeman trying to uncover information differently from a salesperson), as shown in block 720. The flaws and challenges 714 and the identity profile 718 are ways of enacting so as to influence the goal more contextually. For example, the AI character is Indiana Jones and his flaw is that he is scared of snakes. The goal of the AI character is to cross a cavern covered in snakes. Therefore, based on the flaw, the AI character may say, "Oh, I'm so scared of snakes," and then achieve the goal. Therefore, the flaws and challenges 714 are used to add a context to the goal-oriented behavior of the AI character. The identity profile 718 is used similarly to further contextualize the goal-oriented behavior of the AI character. For example, the AI characters may include a police person (a first identity) and a salesperson (a second identity) both trying to uncover information, but the salesperson may do it very differently than the police person.

An emotional profile 722 received from the user may be used to establish an emotional profile of an AI character, such that the emotional profile may influence expression of goals, as shown in block 724. The emotional profile 722 may include the expression. For example, the introvertedness of the AI character may be turned up to make the AI character introverted, in which case if the AI character had to sell something or the AI character had to say something to someone, the AI character may be more nervous than if the AI character was extroverted.

Various parts of memories, such as a personal memory 726, world knowledge 730, and contextual knowledge 734 provide information that may be relevant to the pursuit of a goal. Specifically, the personal memory 726 may be used to provide an AI character with personal memories that may be brought up during the pursuit of a goal, as shown in block 728. For example, if the AI character remembers that the AI character recently was bitten by a dog and the goal is to go in and tie up a dog, the AI character may express fear or angst and say, "Oh, I can do that, but I'm really scared, I had this bad experience." Therefore, changing the behavior of the AI character based on the personal memory 726 makes the behavior more realistic.

The world knowledge 730 may be used to integrate information about the world to contextualize pursuit of the goal, as shown in block 732. The world knowledge 730 may be used to further contextualize the behavior of the AI character. For example, in a specific science fiction world, the AI character knows that all the police are corrupt in an area and working for an evil overlord. Therefore, the AI character may be scared or show more cautious when pursuing an investigation.

The contextual knowledge 734 may be processed to include information about an environment or context to contextualize pursuit of the goal, as shown in block 736. For example, if a volcano has just exploded and the AI character is asked to carry a girl to safety, the AI character may show more hurriedness, and may be forceful to the girl, versus if that was not true, the AI character might pursue the goal differently.

Voice configuration 738 may be used to determine the configuration of voice in real-time, which can allow AI characters to show different expressions when pursuing a goal, as shown in block 740. For example, if the AI character is a fireman who is saving someone, it may be extremely loud in a burning building; therefore, the voice of the AI character may be made loud and forceful. The AI character may pursue the goal differently as compared, for example, the case when the AI character was doing the same actions in a courtroom.

Dialogue style controls 742 may be used to control a dialogue style of an AI character. The dialogue style may influence the manner and style of speech of the AI character, as shown in block 744. For example, the user may set the dialog style to be a modern day New York dialogue style or a Wild West style. In each of the styles, the AI character may use different words. For example, a Wild West bartender may use slang when selling a drink.

Goals and actions 746 received from the user may be processed to specify the goals that an AI character has per scene, and then set up the actions that the AI character has available to pursue the goal, as shown in block 748. Therefore, the goals and actions 746 specify the goals for the scene in which the AI character is currently present, the sequence of goals, and actions that the AI characters have to do to pursue the goals.

Animation triggers and controls 750 may include animations and gestures, which may determine which actual physical movements the AI character can take to pursue the goal, as shown in block 752. For example, the AI character is selling an item and needs to take the item off the shelf and show it to the player when selling.

The input impact for goals model 704 are provided to a plurality of AI models to generate a consequent behavior 754 due to goal configurations, as shown in FIG. 7B. More specifically, the LLM may determine what the AI character needs to say to enact the goal, as shown in block 756. The goals and actions model shown in block 758 is the controller for determining which goals need to be pursued and in which order, when is the goal confirmed as complete, and the like.

The narrative controller determines how the narrative progresses depending on how the AI character pursues the goal (the goal is successful or failed) and if the narrative shifts as a result of a success or a failure, as shown in block 760. For example, in a game an AI character is supposed to save a girl, but the AI character fails, and the girl dies. This failure to complete the goal may change the narrative. The narrative controller may send a trigger to change the behavior of the AI character based on this failure to the game engine.

The text to speech conversion model determines how the AI character speaks his lines (audio) to pursue the goal, as shown in block 762. The parameters to be changed may also include, for example, the dialogue style and voice configuration.

The animation and gesture model may determine what actual actions, animations, or gestures the AI character enacts to pursue the goal (e.g., smiling and taking an item off the shelf, picking up a girl to save her from a burning building), as shown in block 764.

The outputs obtained in blocks 756-764 may include a dialogue output (audio or text) 766, client side narrative triggers 768, and animation controls 770. The dialogue output (audio or text) 766, the client side narrative triggers 768, and the animation controls 770 may be provided to a client 772 (e.g., a client engine, a game engine, a web application, and the like).

Figure 8:
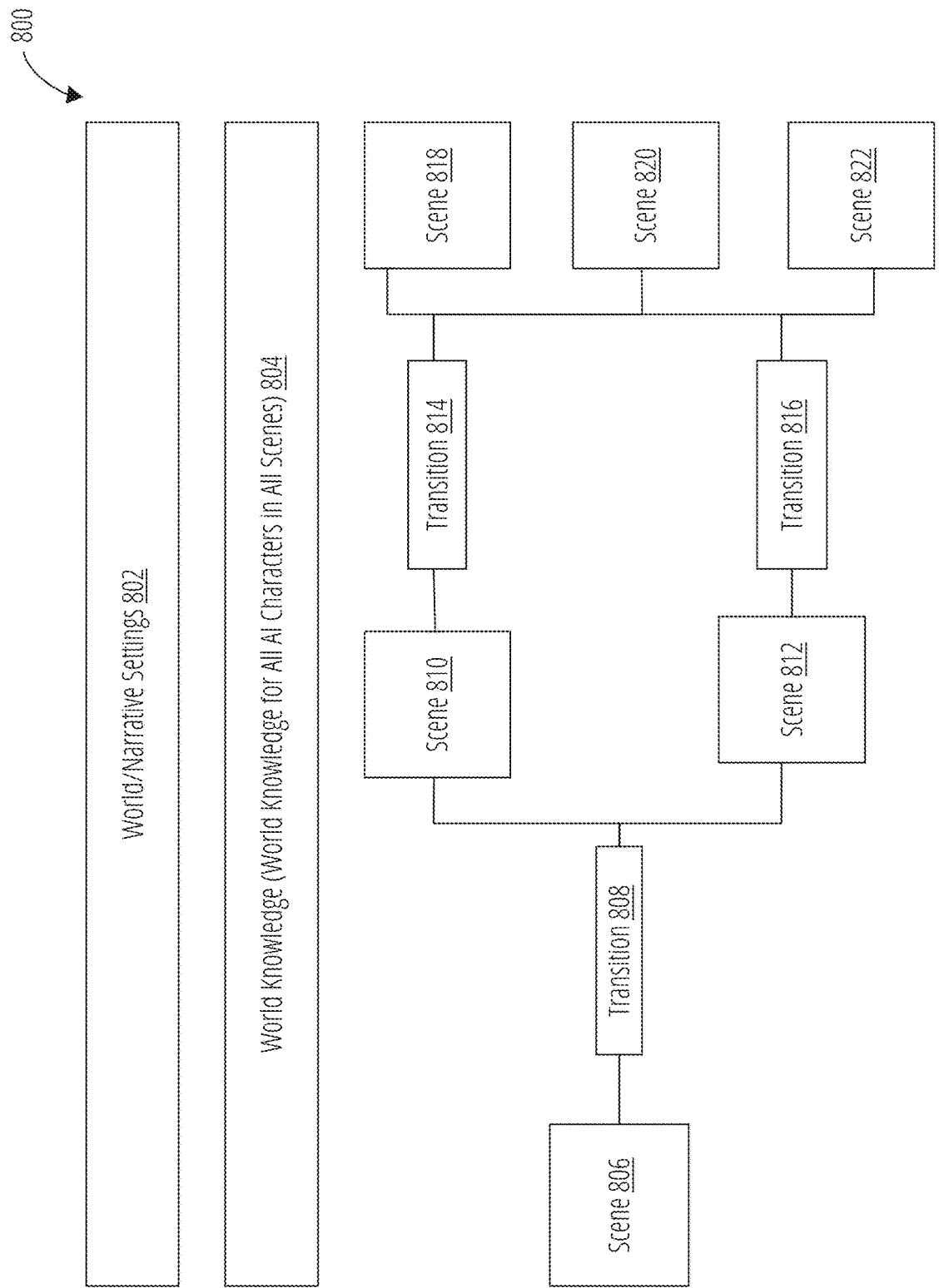
FIG. 8 is a block diagram illustrating a narrative structure that shows a context of scenes used to distinguish context for goals, according to an example embodiment.

FIG. 8 is a block diagram 800 illustrating a narrative structure that shows a context of scenes used to distinguish context for goals, according to an example embodiment. The narrative structure may include world/narrative settings 802 and world knowledge 804 (world knowledge for all AI characters in all scenes). The world/narrative settings 802 and the world knowledge 804 may be used to transition from one scene to another in a story. Therefore, a story or an experience associated with an AI character may happen as a series of scenes and transitions.

In an example embodiment, an AI character may exist in a scene 806. Based on the world/narrative settings 802 and the world knowledge 804, the scene 806 may be transitioned in block 808 into a scene 810 and a scene 812. The scene 810 may be transitioned in block 814 and the scene 812 may be transitioned in block 816 into a scene 818, a scene 820, and a scene 822.

Figure 9:
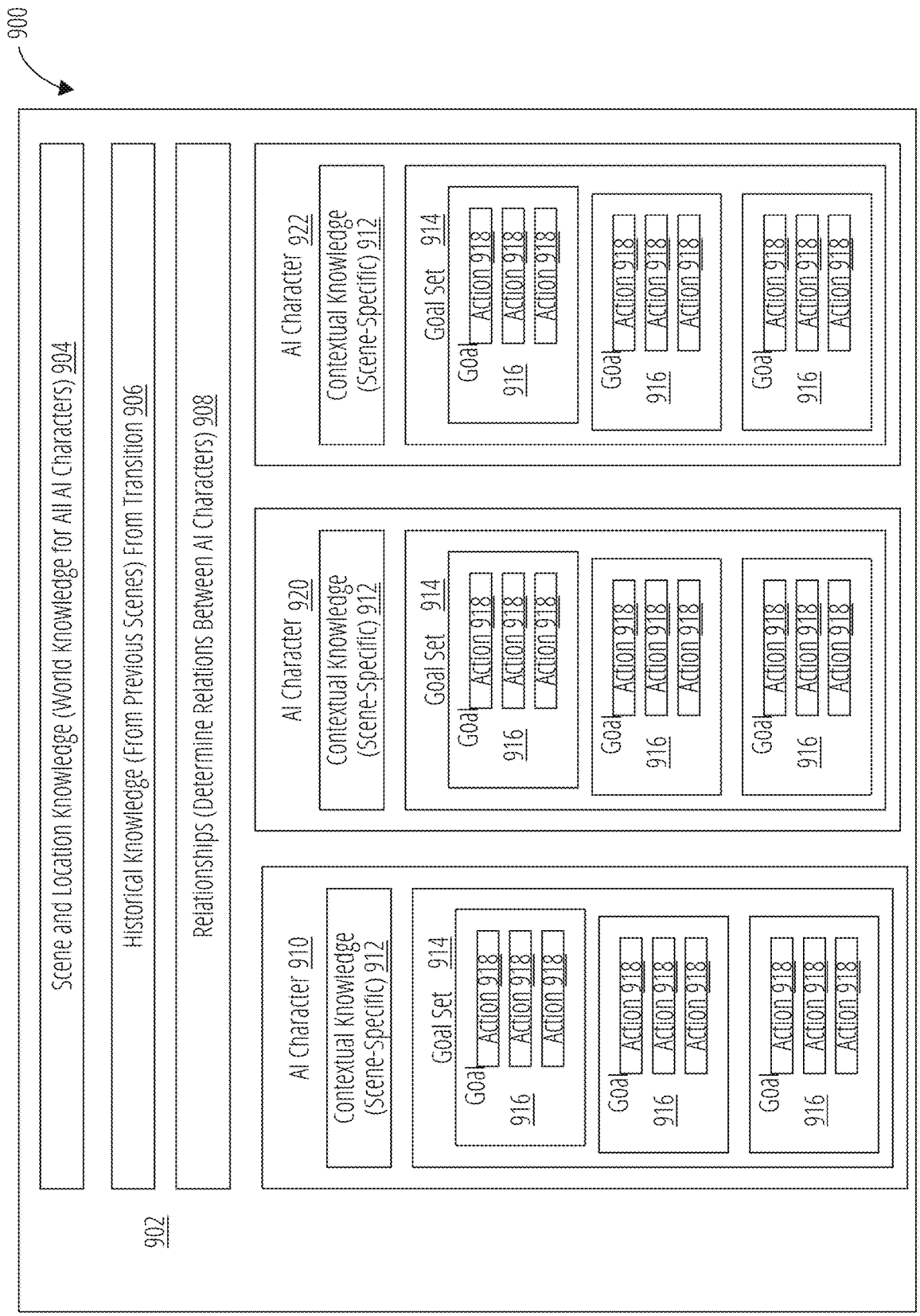
FIG. 9 is a block diagram illustrating a structure of goals within scenes, according to an example embodiment.

FIG. 9 is a block diagram 900 illustrating a structure of goals within scenes, according to an example embodiment. Within each scene, for each specific AI character, there is a goal that the AI character has to pursue. A scene 902 may be driven by a plurality of parameters. The parameters may include scene and location knowledge 904, which may include world knowledge for all AI characters. The parameters may further include historical knowledge 906, which may include knowledge from previous scenes and from transition between the previous scene and the current scene 902. The parameters may further include relationships 908, which determine relations between AI characters 910, 920, and 922. Each of the AI characters 910, 920, and 922 may have contextual knowledge 912, i.e., scene-specific knowledge. Each of the AI characters 910, 920, and 922 may further have a goal set 914. The goal set 914 may include a plurality of goals 916. Each of the goals 916 may be associated with a plurality of actions 918 to be taken by the AI character to pursue the goals 916.

In an example embodiment, scene 902 is a scene in which the AI character 910 is Indiana Jones who enters a cave (scene and location knowledge 904). The context is as follows: the AI character 910 knows that he is scared of snakes (contextual knowledge 912), but he is running away from enemies (contextual knowledge 912) and the AI character 910 now has the first goal 916 to run through the cave and escape the snakes. Therefore, the AI character 910 has actions 918 available to pursue the goal 916. The actions 918 may include running, asking for help, and the like. The next goal 916 of the AI character 910 may be to find the buried treasure. The last goal 916 may be to escape. For each of those goals 916, the AI character 910 has specific actions 918 that are available for the AI character 910 to pursue.

Figure 10:
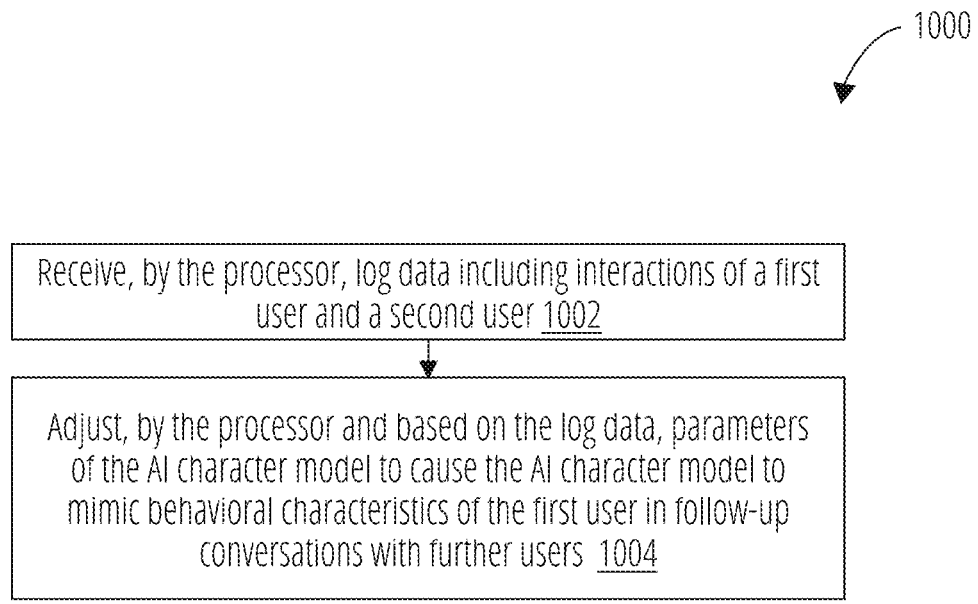
FIG. 10 illustrates a method for observation-based training of an AI character model, according to an example embodiment.

FIG. 10 is a flow chart of a method 1000 for observation-based training of an AI character model, according to an example embodiment. In some embodiments, the operations may be combined, performed in parallel, or performed in a different order. The method 1000 may also include additional or fewer operations than those illustrated. The method 1000 may be performed by processing logic that may comprise hardware (e.g., decision making logic, dedicated logic, programmable logic, and microcode), software (such as software run on a general-purpose computer system or a dedicated machine), or a combination of both. The method 1000 may be implemented with a processor of a computing platform for observation-based training of an AI character model.

The method 1000 may commence in block 1002 with receiving, by the processor, log data. The log data may include interactions of a first user and a second user (i.e., user-to-user interactions), interactions of the first user and an AI character (i.e., character-to-user interactions), and so forth. The interactions may be performed in a virtual environment, also referred to as a computer-based environment. The interactions may include movements of users or AI characters, gestures of users or AI characters, actions taken by users or AI characters, emotions shown by users or AI characters, conversations of users or AI characters in the virtual environment, and so forth.

In some example embodiments, the log data may include a recording of a verbal conversation between the first user and the second user. In an example embodiment, the log data may include a description of a scene in the computer-based environment. The computer-based environment may include, for example, a computer game.

The user may include a developer of the AI character model, a player that interacts with an AI character in a virtual environment, and so forth. In some example embodiments, the log data to be used by the AI character model for learning may be preselected by a developer of an AI character, by a user that interacts with an AI character and wants to set the parameters of the AI character, and so forth.

In block 1004, the method 1000 may include adjusting, by the processor and based on the log data, parameters of the AI character model to cause the AI character model to mimic behavioral characteristics of the first user in follow-up conversations with further users. The AI character model may include an LLM or a generative model and may be configured to learn to mimic any behavior (e.g., behavior of a user or an AI character in a virtual environment) observed by the AI character model. The AI character model may determine the behavioral characteristics of the first user based on the log data. Accordingly, the log data may be used to teach the AI character model to modify the parameters of the AI character to make the AI character to have the behavioral characteristics observed by the AI character model. As the AI character model observes multiple behavioral characteristics of the first user, the AI character model may learn to adjust multiple parameters of the AI character at once. For example, the parameters of the AI character model to be modified may include one or more of the following: a role, an intent, knowledge, an emotional state of an AI character (e.g., friendly, unfriendly, neutral, and the like), a type of personality (sanguine, choleric, melancholic, and phlegmatic), responses in conversations in which the AI character participates, and so forth.

In an example embodiment, the adjustment of the parameters of the AI character model may include modifying internal parameters corresponding to a role of the AI character model to cause the role to match a further role of the first user in the interactions.

In some example embodiments, the adjustment of the parameters of the AI character model may include modifying internal parameters corresponding to an intent of the AI character model to cause the intent to match a further intent of the first user in the interactions.

In an example embodiment, the adjustment of the parameters of the AI character model may include modifying internal parameters corresponding to an emotional state of the AI character model to cause the emotional state to match a further emotional state of the first user in the interactions.

In some example embodiments, the adjustment of the parameters of the AI character model may include modifying internal parameters for generating a response of the AI character model to a specific message of the second user to cause the response to match a further response of the first user to the specific message of the second user in the interactions.

In an example embodiment, the adjustment of the parameters of the AI character model may include modifying internal parameters for generating an action of the AI character model in response to a specific message or a user action of the second user to cause the action to match a further action of the first user in a further response to the specific message or the user action of the second user in the interactions. The action may include one of the following: a gesture, a movement of the AI character model, and so forth.

In the embodiment in which the log data includes the recording of the verbal conversation between the first user and the second user, the adjustment of the parameters of the AI character model may include modifying internal parameters corresponding to voice characteristics of the AI character model, thereby causing the voice characteristics to match further voice characteristics of the first user in the interactions.

The method 1000 may optionally include generating, by the processor, further log data including further interactions between the AI character model and the second user. The further interactions may include messages of the second user in the log data and responses to the messages. The responses may be generated by the AI character model. Upon generating the further log data, method 1000 may proceed with comparing, by the processor, the log data and the further log data to obtain discrepancies between the responses generated by the AI character model and corresponding responses of the first user in the log data. The method 1000 may proceed with performing, by the processor and based on the discrepancies, further adjustments of parameters of the AI character model.

In an example embodiment, the AI character model may generate AI characters that are representatives of different professions. As an example, a user may build an AI character that is a virtual Starbucks® barista. A real human actor may be involved in the environment to play the role of a barista. The interactions of the real human actor can be recorded in log data. The log data can be used to train the AI character model. Thus, the learning of the AI character model may be performed by the AI character model "observing the actor," thereby trying to mimic the whole experience of "the actor." The learning of the AI character model may include a feedback loop that receives the results showing whether the AI character model works. Based on the results, the behavior of the AI character generated by the AI character model may be adjusted.

The log data may be taken from any existing information sources, such as movies, books, comics, and so forth. In an example embodiment, a user may provide a transcript of a movie (e.g., Alice in Wonderland) to a computing platform for training an AI character model and instruct the computing platform to adjust the AI character model to behave more like characters of the movie. The computing platform may use the transcript as the log data, determine the behavioral characteristics (emotions, vocabulary, gestures, knowledge of facts and skills, etc.) of the characters of the movie based on the transcript, and adjust the parameters of the AI character model to behave in the virtual environment similarly to the characters of the movie.

In an example embodiment, a user may have an interaction with an AI character (e.g., Alice in Wonderland) in a virtual world environment and select the interaction as a desired interaction. The user may provide the log data that represent the desired interactions and feed the log data to a computing platform for training an AI character model. The computing platform may use the log data to adjust the parameters of the AI character model to have the behavior similar to the behavior of the user or the AI character in the log data.

In an example embodiment, the log data may be provided to the computing platform for training the AI character model in a form of an example dialog between characters. For example, the user may be creating an AI character that is Captain Jack Sparrow and may upload a transcript from the Pirates of the Caribbean® movie. The computing platform may use the transcript as the log data and bias the AI character model towards behaving like Captain Jack Sparrow.

In another example embodiment, the user may be creating an AI character that is Buzz Lightyear. The AI character model may include a generic model. The user may use every transcript that Buzz Lightyear has ever said across every movie and any other source to teach the AI character model to modify the parameters of the AI character model so as to create an AI character that replicates behavioral characteristics of Buzz Lightyear.

Figure 11:
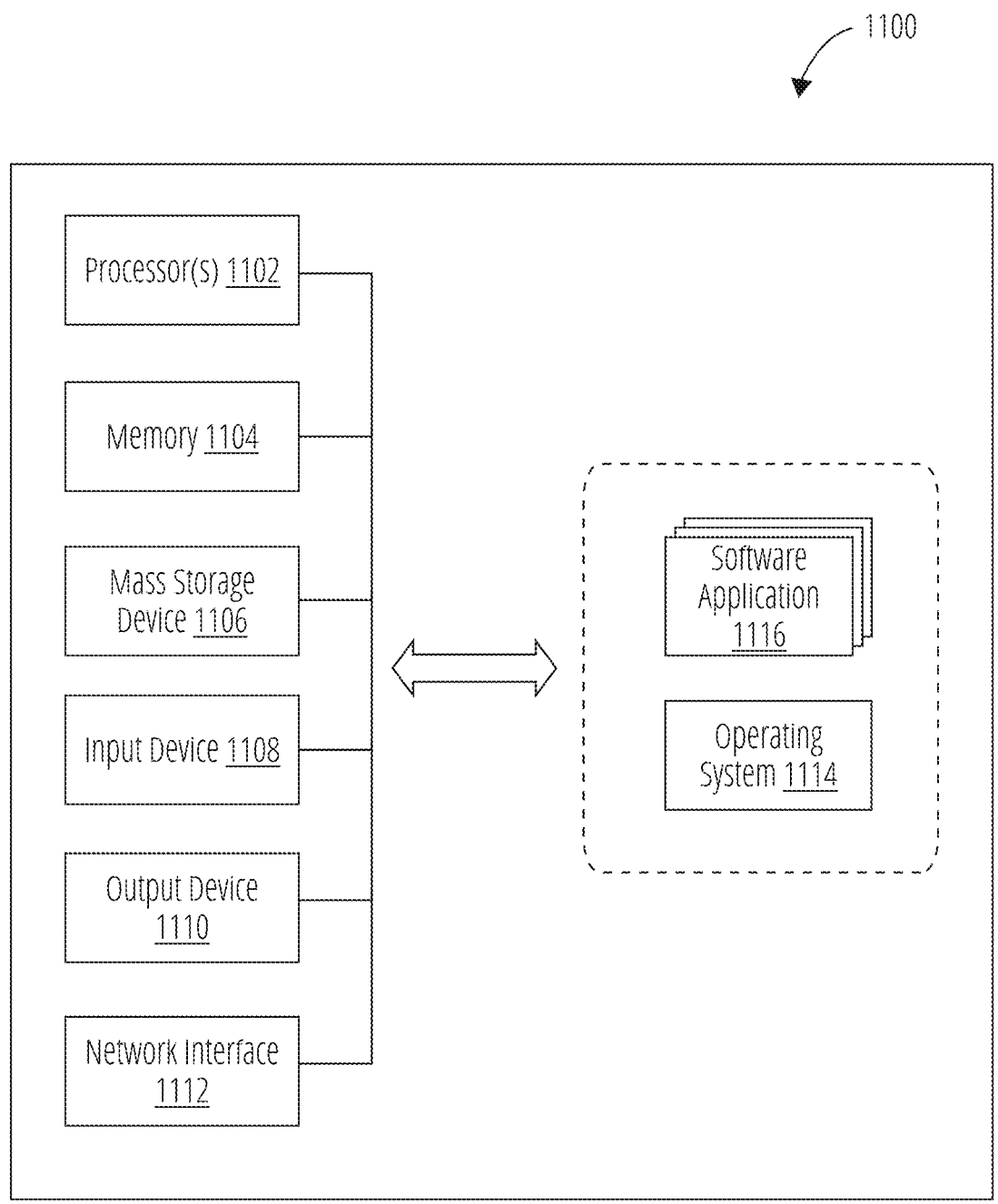
FIG. 11 is a high-level block diagram illustrating an example computer system, within which a set of instructions for causing the machine to perform any one or more of the methodologies discussed herein can be executed.

FIG. 11 is a high-level block diagram illustrating an example computer system 1100, within which a set of instructions for causing the machine to perform any one or more of the methodologies discussed herein can be executed. The computer system 1100 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. Notably, FIG. 11 illustrates just one example of the computer system 1100 and, in some embodiments, the computer system 1100 may have fewer elements/modules than shown in FIG. 11 or more elements/modules than shown in FIG. 11.

The computer system 1100 may include one or more processor(s) 1102, a memory 1104, one or more mass storage devices 1106, one or more input devices 1108, one or more output devices 1110, and a network interface 1112. The processor(s) 1102 are, in some examples, configured to implement functionality and/or process instructions for execution within the computer system 1100. For example, the processor(s) 1102 may process instructions stored in the memory 1104 and/or instructions stored on the mass storage devices 1106. Such instructions may include components of an operating system 1114 or software applications 1116. The software applications may include the studio 204, the integration interface 206, and the AI character model 202. The computer system 1100 may also include one or more additional components not shown in FIG. 11, such as a housing, a power supply, a battery, a global positioning system (GPS) receiver, and so forth.

The memory 1104, according to one example, is configured to store information within the computer system 1100 during operation. The memory 1104, in some example embodiments, may refer to a non-transitory computer-readable storage medium or a computer-readable storage device. In some examples, the memory 1104 is a temporary memory, meaning that a primary purpose of the memory 1104 may not be long-term storage. The memory 1104 may also refer to a volatile memory, meaning that the memory 1104 does not maintain stored contents when the memory 1104 is not receiving power. Examples of volatile memories include random access memories (RAM), dynamic random access memories (DRAM), static random access memories (SRAM), and other forms of volatile memories known in the art. In some examples, the memory 1104 is used to store program instructions for execution by the processor(s) 1102. The memory 1104, in one example, is used by software (e.g., the operating system 1114 or the software applications 1116). Generally, the software applications 1116 refer to software applications suitable for implementing at least some operations of the methods for observation-based training of an AI character model as described herein.

The mass storage devices 1106 may include one or more transitory or non-transitory computer-readable storage media and/or computer-readable storage devices. In some embodiments, the mass storage devices 1106 may be configured to store greater amounts of information than the memory 1104. The mass storage devices 1106 may further be configured for long-term storage of information. In some examples, the mass storage devices 1106 include non-volatile storage elements. Examples of such non-volatile storage elements include magnetic hard disks, optical discs, solid-state discs, flash memories, forms of electrically programmable memories (EPROM) or electrically erasable and programmable memories, and other forms of non-volatile memories known in the art.

The input devices 1108, in some examples, may be configured to receive input from a user through tactile, audio, video, or biometric channels. Examples of the input devices 1108 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1100, or components thereof.

The output devices 1110, in some examples, may be configured to provide output to a user through visual or auditory channels. The output devices 1110 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 1110 may also include a touchscreen, a presence-sensitive display, or other input/output capable displays known in the art.

The network interface 1112 of the computer system 1100, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 1112 may be a network interface card, such as an Ethernet card, an optical transceiver, a radio frequency transceiver, or any other type of device that can send and receive information.

The operating system 1114 may control one or more functionalities of the computer system 1100 and/or components thereof. For example, the operating system 1114 may interact with the software applications 1116 and may facilitate one or more interactions between the software applications 1116 and components of the computer system 1100. As shown in FIG. 11, the operating system 1114 may interact with or be otherwise coupled to the software applications 1116 and components thereof. In some embodiments, the software applications 1116 may be included in the operating system 1114. In these and other examples, virtual modules, firmware, or software may be part of the software applications 1116.

Thus, systems and methods for observation-based training of an AI character model have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
   receiving, by at least one processor, log data including interactions of a user and a first Artificial Intelligence (AI) character model configured to interact with the user;
   receiving, by the at least one processor, internal parameters of a second AI character model including a first plurality of heuristic machine learning models and a second plurality of primary machine learning models;
   pre-processing, by the at least one processor, the log data to obtain one or more data streams including behavioral characteristics of the user;
   running, by the at least one processor, the one or more data streams through the first plurality of heuristic machine learning models to produce intermediate outputs;
   composing, by the at least one processor, the intermediate outputs into templated formats; and
   providing, by the at least one processor, the templated formats to the second plurality of primary machine learning models, wherein the internal parameters of the second AI character model are adjusted based on the templated formats such that, when the second AI character model interacts with the first AI character model, the second AI character model mimics the behavioral characteristics of the user.

2. The method of claim 1, wherein:
   the one or more data streams include a first parameter corresponding to a role of the user in the interactions with the first AI character model; and
   the adjustment of the internal parameters of the second AI character model includes changing a second parameter of the second AI character model to the first parameter, the second parameter corresponding to a role of the second AI character model.

3. The method of claim 1, wherein:
   the one or more data streams include a first parameter corresponding to an intent of the user in the interactions with the first AI character model; and
   the adjustment of the internal parameters of the second AI character model includes changing a second parameter of the second AI character model to the first parameter, the second parameter corresponding to an intent of the second AI character model.

4. The method of claim 1, wherein:
   the one or more data streams include a first parameter corresponding to a first emotional state of the user while the user interacts with the first AI character model; and
   the adjustment of the internal parameters of the second AI character model includes changing a second parameter of the second AI character model to the first parameter, the second parameter corresponding to a second emotional state associated with the second AI character model.

5. The method of claim 1, wherein:
the one or more data streams include an indication that the user has pronounced a specific message in response to one or more words generated by the first AI character model; and
the adjustment of the internal parameters of the second AI character model includes changing at least one parameter of a language model associated with the second AI character model to cause the language model to generate the specific message in response to receiving the one or more words from a further user or a third AI character model.

6. The method of claim 1, wherein:
the one or more data streams include an indication that the user has performed a specific action in response to one or more words generated by the first AI character model; and
the adjustment of the internal parameters of the second AI character model includes changing at least one parameter of the second AI character model to cause the second AI character model to generate the specific action in response to receiving the one or more words from a further user or a third AI character model.

7. The method of claim 6, wherein the specific action includes one of the following: a gesture of the second AI character model and a movement of the second AI character model.

8. The method of claim 1, wherein:
the one or more data streams include a first parameter corresponding to first voice characteristics of the user in the interactions with the first AI character model; and
the adjustment of the internal parameters of the second AI character model includes changing a second parameter of the second AI character model to the first parameter, the second parameter corresponding to second voice characteristics of the second AI character model.

9. The method of claim 1, wherein the one or more data streams include one or more of the following:
a first stream of a text pronounced by the user during the interactions;
a second stream of actions performed by the user during the interactions; and
a third stream of events occurring during the interactions.

10. The method of claim 1, wherein the log data include a description of a scene in a computer-based environment.

11. A computing system comprising:
at least one processor; and
a memory storing instructions that, when executed by the at least one processor, configure the computing system to:
receive log data including interactions of a user and a first Artificial Intelligence (AI) character model configured to interact with the user;
receive internal parameters of a second AI character model including a first plurality of heuristic machine learning models and a second plurality of primary machine learning models;
pre-process the log data to obtain one or more data streams including behavioral characteristics of the user;
run the one or more data streams through the first plurality of heuristic machine learning models to produce intermediate outputs;
compose the intermediate outputs into templated formats; and
provide the templated formats to the second plurality of primary machine learning models, wherein the internal parameters of the second AI character model are adjusted based on the templated formats such that, when the second AI character model interacts with the first AI character model, the second AI character model mimics the behavioral characteristics of the user.

12. The computing system of claim 11, wherein:
the one or more data streams include a first parameter corresponding to a role of the user in the interactions with the first AI character model; and
the adjustment of the internal parameters of the second AI character model includes changing a second parameter of the second AI character model to the first parameter, the second parameter corresponding to a role of the second AI character model.

13. The computing system of claim 11, wherein:
the one or more data streams include a first parameter corresponding to an intent of the user in the interactions with the first AI character model; and
the adjustment of the internal parameters of the second AI character model includes changing a second parameter of the second AI character model to the first parameter, the second parameter corresponding to an intent of the second AI character model.

14. The computing system of claim 11, wherein:
the one or more data streams include a first parameter corresponding to a first emotional state of the user while the user interacts with the first AI character model; and
the adjustment of the internal parameters of the second AI character model includes changing a second parameter of the second AI character model to the first parameter, the second parameter corresponding to a second emotional state associated with the second AI character model.

15. The computing system of claim 11, wherein:
the one or more data streams include an indication that the user has pronounced a specific message in response to one or more words generated by the first AI character model; and
the adjustment of the internal parameters of the second AI character model includes changing at least one parameter of a language model associated with the second AI character model to cause the language model to generate the specific message in response to receiving the one or more words from a further user or a third AI character model.

16. The computing system of claim 11, wherein:
the one or more data streams include an indication that the user has performed a specific action in response to one or more words generated by the first AI character model; and
the adjustment of the internal parameters of the second AI character model includes changing at least one parameter of the second AI character model to cause the second AI character model to generate the specific action in response to receiving the one or more words from a further user or a third AI character model.

17. The computing system of claim 16, wherein the specific action includes one of the following: a gesture of the second AI character model and a movement of the second AI character model.

18. The computing system of claim 11, wherein:
the one or more data streams include a first parameter corresponding to first voice characteristics of the user in the interactions with the first AI character model; and
the adjustment of the internal parameters of the second AI character model includes changing a second parameter of the second AI character model to the first parameter, the second parameter corresponding to second voice characteristics of the second AI character model.

19. The computing system of claim 11, wherein the one or more data streams include one or more of the following:
- a first stream of a text pronounced by the user during the interactions;
- a second stream of actions performed by the user during the interactions; and
- a third stream of events occur during the interactions.

20. A non-transitory computer-readable storage medium, the computer-readable storage medium including instructions that, when executed by a computer, cause the computer to:
- receive, by at least one processor, log data including interactions of a user and a first Artificial Intelligence (AI) character model configured to interact with the user;
- receive, by the at least one processor, internal parameters of a second AI character model including a first plurality of heuristic machine learning models and a second plurality of primary machine learning models;
- pre-process, by the at least one processor, the log data to obtain one or more data streams including behavioral characteristics of the user;
- run, by the at least one processor, the one or more data streams through the first plurality of heuristic machine learning models to produce intermediate outputs;
- compose, by the at least one processor, the intermediate outputs into templated formats; and
- provide, by the at least one processor, the templated formats to the second plurality of primary machine learning models, wherein the internal parameters of the second AI character model are adjusted based on the templated formats such that, when the second AI character model interacts with the first AI character model, the second AI character model mimics the behavioral characteristics of the user.

* * * * *